(12) United States Patent
Agrawal et al.

(10) Patent No.: US 9,432,794 B2
(45) Date of Patent: Aug. 30, 2016

(54) TECHNIQUES FOR MOBILITY-AWARE DYNAMIC SERVICE PLACEMENT IN MOBILE CLOUDS

(71) Applicant: International Business Machines Corporation, Armonk, NY (US)

(72) Inventors: Dakshi Agrawal, Monsey, NY (US); Ting He, Piermont, NY (US); Ramya Raghavendra, White Plains, NY (US); Yang Song, San Jose, CA (US)

(73) Assignee: International Business Machines Corporation, Armonk, NY (US)

( * ) Notice: Subject to any disclaimer, the term of this patent is extended or adjusted under 35 U.S.C. 154(b) by 266 days.

(21) Appl. No.: 14/188,158

(22) Filed: Feb. 24, 2014

(65) Prior Publication Data

US 2015/0245160 A1     Aug. 27, 2015

(51) Int. Cl.
    H04M 11/00    (2006.01)
    H04W 4/00     (2009.01)
    H04M 15/00    (2006.01)

(52) U.S. Cl.
    CPC ......... *H04W 4/001* (2013.01); *H04M 15/8044* (2013.01)

(58) Field of Classification Search
    CPC ..... H04W 4/02; H04W 4/025; H04W 4/027; H04W 4/028; H04W 4/18; H04W 36/00; H04W 60/00
    USPC ............... 455/406, 432.1, 435.1, 436, 414.1, 455/414.2, 456.1
    See application file for complete search history.

(56) References Cited

U.S. PATENT DOCUMENTS

| | | |
|---|---|---|
| 6,829,654 B1 | 12/2004 | Jungck |
| 8,352,392 B2 | 1/2013 | Swift et al. |
| 8,369,876 B2 | 2/2013 | Bachmann et al. |
| 8,984,136 B1 * | 3/2015 | Francis, Jr. ............. H04W 4/02 700/245 |
| 2009/0154463 A1 | 6/2009 | Hines et al. |
| 2010/0159895 A1 | 6/2010 | Wallis et al. |
| 2011/0075675 A1 | 3/2011 | Koodli et al. |
| 2011/0191452 A1 | 8/2011 | Hu |
| 2011/0231552 A1 | 9/2011 | Carter et al. |

(Continued)

OTHER PUBLICATIONS

J. Famaey, et al., "A latency-aware algorithm for dynamic service placement in large-scale overlays," IFIP/IEEE International Symposium on Integrated Network Management, 2009, pp. 414-421 (Jun. 2009).

(Continued)

*Primary Examiner* — Temica M Beamer
(74) *Attorney, Agent, or Firm* — Mercedes L. Hobson; Michael J. Chang, LLC

(57) ABSTRACT

Techniques to adaptively launch/replace applications and services on edge devices in a cellular infrastructure and/or adaptively place content and computation at the edge devices based on logic at the network core are provided. In one aspect, a method for dynamic placement of applications in a cellular network mobile cloud is provided which includes the steps of: (a) obtaining: (i) a model of the cellular network, (ii) a model of user mobility patterns in the cellular network, and (iii) a model of a profile of the applications; (b) upon receipt of requests from users for the applications, obtaining runtime states at edge servers in the mobile cloud; and (c) upon obtaining the runtime states at the edge servers, placing the requests among the edge servers and a core server in the mobile cloud based on the models obtained in step (a) and the runtime states obtained in step (b).

16 Claims, 8 Drawing Sheets

(56) References Cited

U.S. PATENT DOCUMENTS

| | | | |
|---|---|---|---|
| 2012/0131178 A1 | 5/2012 | Zhu et al. | |
| 2012/0173689 A1 | 7/2012 | Yang | |
| 2012/0218901 A1 | 8/2012 | Jungck et al. | |
| 2012/0226789 A1 | 9/2012 | Ganesan et al. | |
| 2012/0239792 A1 | 9/2012 | Banerjee et al. | |
| 2014/0172953 A1* | 6/2014 | Blanksteen | H04W 4/02 709/203 |
| 2015/0156122 A1* | 6/2015 | Singh | H04L 47/20 370/235 |
| 2015/0207720 A1* | 7/2015 | Dagum | H04L 43/50 370/252 |

OTHER PUBLICATIONS

Q. Zhang et al., "Dynamic service placement in shared service hosting infrastructures," IFIP International Conference on Networking 2010, pp. 251-264 (May 2010).

C. Schindelhauer, "Mobility in Wireless Networks," Proceedings of the 32nd conference on Current Trends in Theory and Practice of Computer Science SOFSEM'06, pp. 100-116 (Jan. 2006).

Qian et al., "Profiling Resource Usage for Mobile Applications: A Cross-layer Approach," Proceedings of the 9th International Conference on Mobile Systems, Applications, and Services, MobiSys'11, Jun. 28-Jul. 1, 2011.

A. Alvarez et al., "Mobile application profiling with TestelDroid," 2012 IEEE Consumer Communications and Networking Conference (CCNC) (Jan. 2012).

Diaz et al., "Mobile Application Profiling for Connected Mobile Devices," Pervasive Computing, IEEE, vol. 9, issue 1 (Jan.-Mar. 2010).

Schroedl et al., "Mining GPS Traces for Map Refinement," Data Mining and Knowledge Discovery, 9, 59-87 (Jul. 2004).

Steiner et al., "Network-Aware Service Placement in a Distributed Cloud Environment," SIGCAMM '12 Aug. 13-17, Helsinki, Finland.

Tariq et al., "Mobility Aware Server Selection for Mobile Streaming Multimedia Content Distribution Networks," Proceedings of the 8th International Workshop on Web Content Caching and Distribution, pp. 1-18 (Oct. 2004).

Tariq et al., "Mobility Aware Server Selection for Mobile Streaming Multimedia Content Distribution Networks," Proceedings of the $8^{th}$ International Workshop on Web Content Caching and Distribution, pp. 1-18 (Oct. 2004).

\* cited by examiner

TECHNIQUES FOR MOBILITY-AWARE DYNAMIC SERVICE PLACEMENT IN MOBILE CLOUDS

FIELD OF THE INVENTION

The present invention relates to dynamic application/service placement in mobile clouds and more particularly, to techniques for mobility- and cellular-infrastructure aware application and service placement to i) adaptively launch/replace applications and services on edge devices in a cellular infrastructure and/or ii) adaptively place content and computation at the edge devices based on logic at the network core.

BACKGROUND OF THE INVENTION

The idea of dynamic service placement has been proposed in the area of cloud computing and overlay networking. See, for example, J. Famaey, et al., "A latency-aware algorithm for dynamic service placement in large-scale overlays," IFIP/IEEE International Symposium on Integrated Network Management, 2009, pgs. 414-421 (June 2009); and Q. Zhang et al., "Dynamic service placement in shared service hosting infrastructures," IFIP International Conference on Networking 2010, pgs. 251-264 (May 2010). These approaches, however, do not consider the specifics of cellular networks such as tree-like backhaul topology, heterogeneous capacities of edge/core servers, and user mobility.

Next generation cellular networks utilize more intelligent edge devices such as eNodeB which enjoys greatly enhanced computational and analytics capability in order to serve the mobile users' certain application and service requests at the edge rather than at the core network as in traditional cellular network systems. Existing solutions usually select a set of applications and services and load them at the edge devices. If a mobile client requests a pre-loaded application or service, the edge device will provide the service utilizing local computational resources (e.g., CPU and memory). If the requested service or application is not loaded in the edge device, the request will be forwarded to the core network for execution. Selecting a proper set of applications to load is important for fully realizing the benefit of using such edge devices.

Thus, improved techniques for placing applications and services at cellular network edge devices would be desirable.

SUMMARY OF THE INVENTION

The present invention provides techniques for mobility- and cellular-infrastructure aware application and service placement to adaptively launch/replace applications and services on edge devices in a cellular infrastructure and/or adaptively place content and computation at the edge devices based on logic at the network core. In one aspect of the invention, a method for dynamic placement of applications in a cellular network mobile cloud is provided. The method includes the steps of: (a) obtaining: (i) a model of the cellular network, (ii) a model of user mobility patterns in the cellular network, and (iii) a model of a profile of the applications; (b) upon receipt of requests from users for the applications, obtaining runtime states at edge servers in the mobile cloud; and (c) upon obtaining the runtime states at the edge servers, placing the requests among the edge servers and a core server in the mobile cloud based on the models obtained in step (a) and the runtime states obtained in step (b).

A more complete understanding of the present invention, as well as further features and advantages of the present invention, will be obtained by reference to the following detailed description and drawings.

DETAILED DESCRIPTION OF PREFERRED EMBODIMENTS

As provided above, conventional approaches to dynamic service placement do not consider the specifics of cellular networks such as tree-like backhaul topology, heterogeneous capacities of edge/core servers, and user mobility. The present techniques substantially improve the performance of application and service placement by exploiting these specifics. The present techniques utilize the technology of application portability that allows one to store a large number of application images on an edge device, and only activate a select few at run time based on user needs. This technology enables dynamic application and service placement on edge devices as proposed herein.

One core idea of the present techniques is to incorporate three unique features of the cellular domain: (a) unique tree-like topology of cellular networks; (b) patterns of user mobility; (c) large disparity in performance/cost ratio of servers towards the edge versus servers in the core network.

By exploiting these three unique characteristics, a substantial performance improvement can be realized over prior systems of application and service placement that have been implemented for overlay networks and cloud data centers.

Figure 1:
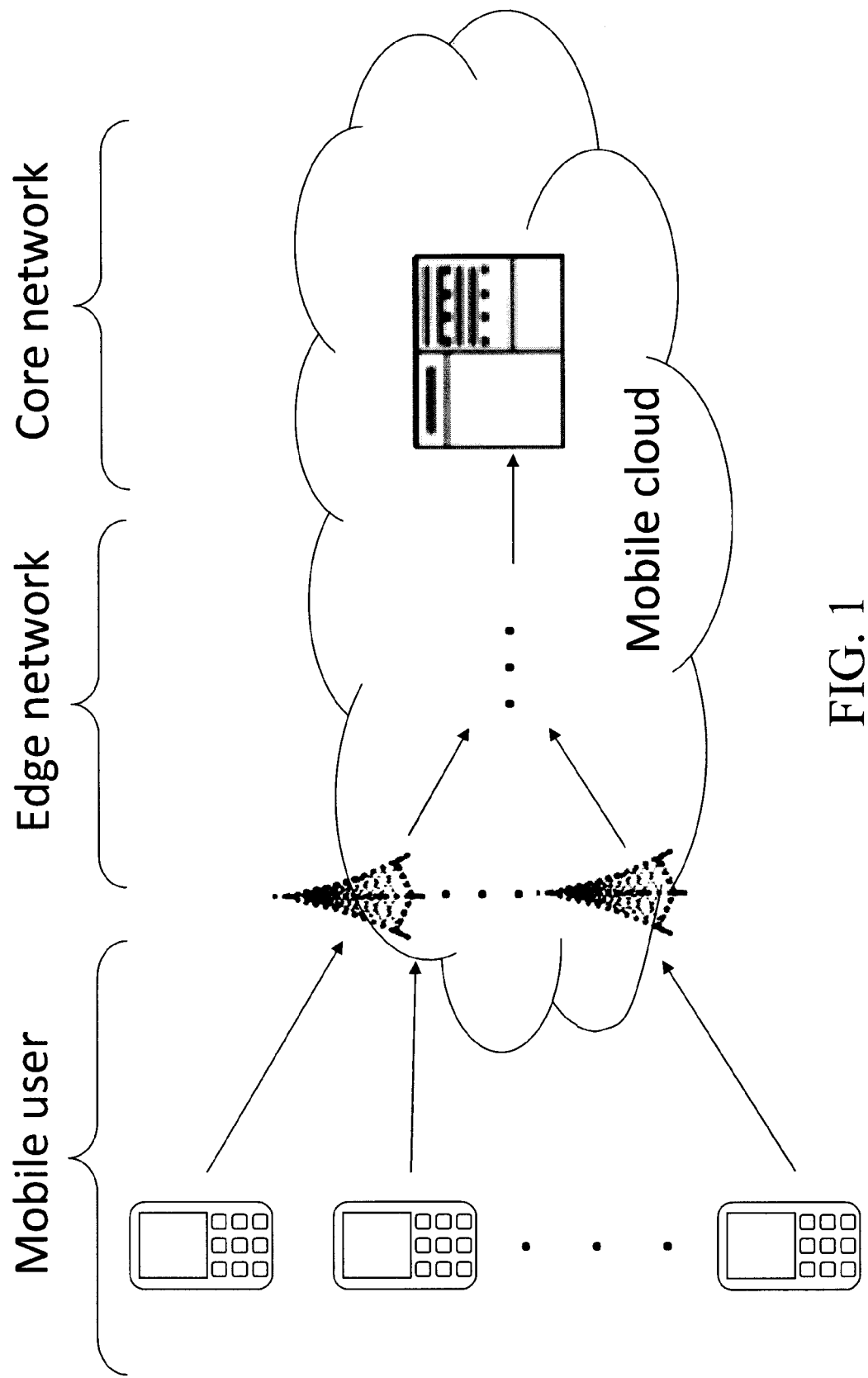
FIG. 1 is a diagram illustrating an exemplary wireless network in which the present techniques may be implemented according to an embodiment of the present invention.

FIG. 1 is a diagram illustrating an exemplary wireless network in which the present techniques may be implemented. As shown in FIG. 1, when a user's request arrives at the edge network, the edge device first checks whether the requested application or service is available locally, or whether it can be launched locally using remaining CPU or memory resources.

Applications or services can be heterogeneous in terms of computation time, response time requirements, CPU/memory requirements, and network bandwidth requirements. For example, a GPS re-direction request involves light computation yet stringent response time requirement and thus is suitable for edge computation. On the other hand, a video transcoding service requires significant computational resources and may be more suitable to be run at the core. Furthermore, if an edge device decides to allocate local resources for an accepted request, future arrival requests might be redirected to the core due to lack of resources at the edge. The comparison between edge and core also depends on user mobility, e.g., video streaming is normally best served from the edge due to saved backhaul bandwidth and shortened round-trip delay, but for a highly mobile user, it is better served from the core to minimize interruption during handoff.

Therefore, application and service placement decisions need to be made while being aware of application heterogeneity, with the aid of predictive analytics on request arrivals and mobility patterns of users. The present techniques solve the decision problem of application and service placement by jointly considering factors such as the type and requirement of each application and service request, capabilities of edge and core servers, as well as predictions on future demands and connection times using user mobility patterns.

Thus, in general, the present techniques focus on utilizing the mobility information and the application and service request specifications to make the dynamic service and application placement decisions. The present placement decision techniques may be implemented at the edge and/or at the core. For instance, FIG. 2 is a schematic diagram illustrating the instant placement decisions being made at the edge network, and FIG. 3 is a schematic diagram illustrating the instant placement decisions being made at the core.

Figure 2:
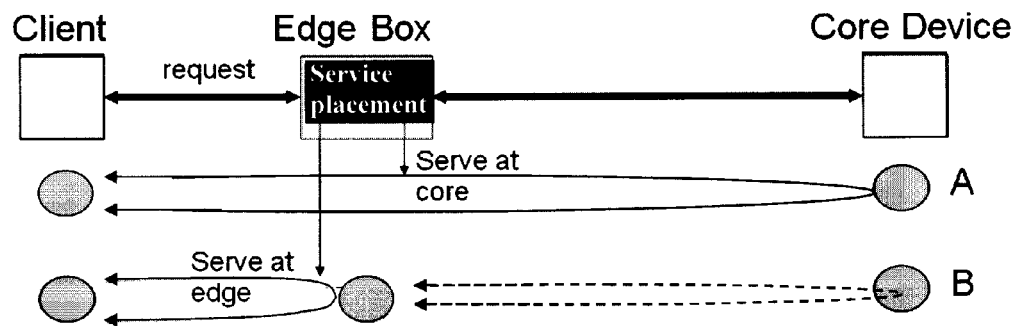
FIG. 2 is a schematic diagram illustrating placement decisions being made at the edge network according to an embodiment of the present invention.

As shown in FIG. 2, according to one exemplary embodiment of the present techniques when a user request is received from a client device, the decision to serve a requested application or service at the core (Decision A) or at edge network (Decision B) is in this example made at the edge. The shaded circles in FIG. 2 represent decision points in processing a service request. Namely, there are three points of decision, one in the user space at the user's (mobile) device and the other two in the wireless network provider space: 1) at the edge server and 2) at the core server. The present techniques are concerned with the decision points in the wireless network provider space.

Figure 3:
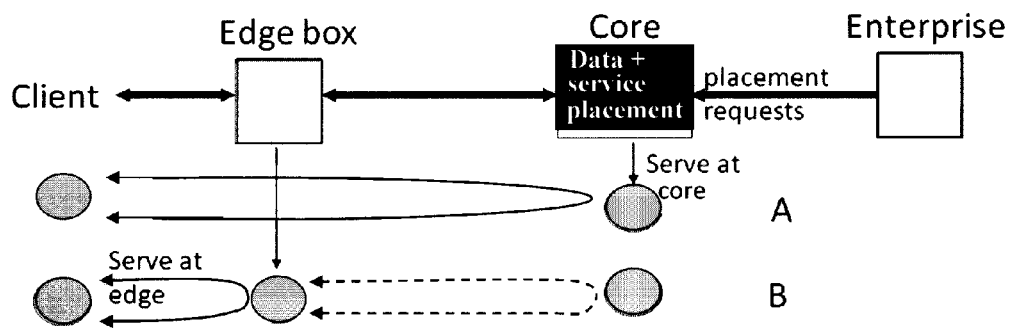
FIG. 3 is a schematic diagram illustrating instant placement decisions being made at the core according to an embodiment of the present invention.

Alternatively, as shown in FIG. 3, when a user request is received from a client device, the decision to serve a requested application or service at the core (Decision A) or at the edge network (Decision B) is in this example made at the core. As above, the shaded circles in FIG. 3 represent decision points in processing a service request. Namely, there are three points of decision, one in the user space at the user's (mobile) device and the other two in the wireless network provider space: 1) at the edge server and 2) at the core server.

By way of example only, some suitable edge-based applications include, but are not limited to:
Bandwidth Saving Applications
(B1) Content Distribution Networks/Caching
(B2) Analytics on video at the edge
(B3) Byte-caching
(B4) Streaming video delivery from the edge
(B5) Device Admission Control at the edge
Delay Sensitive Applications
(D1) Real-time Game Consoles at Cell-towers
(D2) Coordination of traffic cameras
(D3) Interactive computation (Matlab Mobile)
Applications with Special Information
(I1) Radio-aware content transcoding
(I2) Radio-aware video optimization
(I3) Push Services (Location dependent)
(I4): Predictive Bandwidth on Demand
M2M/IoT/Analytics Applications
(M1) Tracking of assets at scale
(M2) Surge control for sensors due to fail-over
(M3) Preprocessing and Information Aggregation at Edge
(M4) Anomaly Detection in information collected at the edge
(M5) Health Check of deployed sensing equipment
Runtime factors that affect (edge-based) suitability include, but are not limited to, application popularity (relative request volume), nature of request (long/short, compute-intensive/network-intensive) and/or user mobility (connection time to one edge server).

By way of example only, some possible core (enterprise)-based applications include, but are not limited to:
Bandwidth Saving Applications
(B1) Email databases
(B2) Employee data access
(B3) Business analytics
Delay Sensitive Applications
(D1) Video conferencing
(D2) Real time messaging
(D3) Interactive computation (Matlab Mobile)
Applications with Special Information
(I1) Radio-aware content transcoding
(I2) Radio-aware video optimization
(I3) Push Services (software patches)
(I4): Predictive Bandwidth on Demand
M2M/IoT/Analytics Applications
(M1) Tracking of assets at scale
(M2) Surge control for sensors due to fail-over
(M3) Preprocessing and Information Aggregation at Edge
(M4) Anomaly Detection in information collected at the edge
(M5) Health Check of deployed sensing equipment
Runtime factors that affect (enterprise/core-based) suitability include, but are not limited to, user mobility (connection time to one or more edge servers), application and data popularity (relative request volume), nature of request (long/short, compute-intensive/network-intensive), computation available at edge vs. core, storage available at edge vs. core. As is apparent, some applications are possible both at the edge and the core. Deciding which (edge or core) is a better choice in a dynamic way is one of the goals of the present techniques, by utilizing some unique features of mobile clouds.

Figure 4:
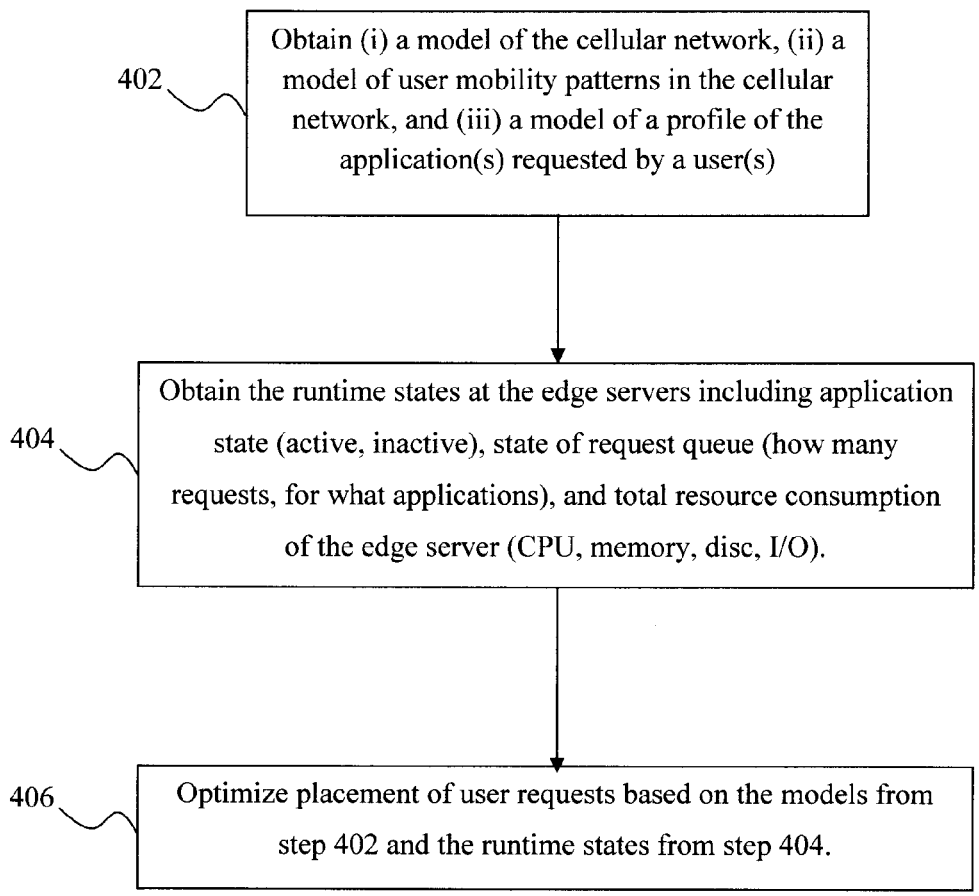
FIG. 4 is a diagram illustrating an exemplary methodology for dynamic placement of applications in a cellular network mobile cloud according to an embodiment of the present invention.

Given the above, an overview of the present techniques is now provided by way of reference to FIG. 4. Following the description of FIG. 4 below, specific embodiments where the placement decisions are made at the edge and specific embodiments where the placement decisions are made at the core of the mobile cloud are then provided. FIG. 4 is however described in the general context of the placement decisions being made either at the edge servers or at the core, and thus is applicable to both scenarios.

FIG. 4 is a diagram illustrating exemplary methodology 400 for the dynamic placement of applications in a cellular network mobile cloud, such as that shown in FIG. 1. As provided above, user requests are received by the edge servers in the network. Based on these requests, in step 402, models of the cellular network, user mobility patterns in the cellular network, and a profile of the requested application(s) are obtained. Each of these models will be described in detail below. In general however, the cellular network model provides an overall structure of the network that can change over time. Use of a network model permits the present techniques to take into consideration the unique tree-like topology of different cellular networks. The user mobility patterns model allows for the analysis of users' movements in the network and thus permits prediction of factors such as through which edge servers a user will access the network, and when, connection time and response time requirements, etc.—see below. The application profile model provides insights on the computational demands of the application (e.g., CPU/memory/network bandwidth resource consumption).

The models can be obtained from one or more sources. For example, as will be described in detail below, the model of the cellular network can be obtained from a network administrator, e.g., the network administrator can provide and/or update parameters of the network model, and/or select model or model parameters from an existing list of models. The models can also be obtained from relevant third parties such as application developers who are best equipped to provide insights on the specifics of a particular application.

The models can also be obtained using the request history of the edge servers. Basically, the history of past requests received at various edge servers can be used to infer the resource requirements (aka computational demands) in processing a request for the application under consideration, and also the volume of requests distributed over time and/or across edge servers. Thus, according to an exemplary embodiment, the edge server request histories are leveraged to provide data related to which applications were requested from which edge servers by which users, when the requests were made, and what were the computational demands (CPU/memory/network bandwidth resource consumption) of the requests.

In step 404, the runtime states at edge servers in the mobile cloud are obtained. According to an exemplary embodiment, the runtime states at the edge servers are based on i) a status of a requested application at the edge (e.g., whether the application is active or inactive at the edge), ii) a state of the request queue for the edge servers (e.g. how many requests and for what applications), and iii) a total resource consumption of the edge servers (based, e.g., on CPU, memory, and/or network bandwidth consumption). The runtime states at the edge servers will factor into the decision process as whether to service a given request at the edge or at the core. For instance, it is important to know whether a requested application is already active at the edge (or not). Likewise knowing the extent of the request queue at the edge can be useful in determining, for example, a predicted response time (if the request is added to the edge queue) and importantly whether, based on the response time, there is enough time to service the request at the edge. These aspects will be discussed in greater detail below.

In step 406, the placement of the requests is optimized among the edge and core servers in the network based on the models (from step 402) and the runtime states (from step 404). As will be described in detail below, this placement optimization involves use of a cost function that generally compares a cost of servicing a user request at the edge versus servicing the request at the core. Thus, if the cost of servicing a particular user request at the edge is greater than a cost of servicing the request at the core, then the request might be forwarded onto the core.

However, factors in addition to cost may also be considered in making the placement decisions. For example, as will be described in detail below, one additional factor to consider is connection time (i.e., the time in which the user is connected to an edge server). The decision whether to service a request by the user might then take into account whether there is enough connection time remaining to service the request at the edge (based, for example, on a predicted response time—see below). If there is an insufficient amount of connection time remaining, the request may instead be forwarded to another server (whether that be to the core server, or another edge server—if the cost savings is greater than servicing the request at the core).

Other factors to be considered below include a replacement overhead. For instance, in order to service a particular request at the edge, it may be necessary to replace one of the applications currently active at the edge. Taking into account factors such as the cost and capacity at the edge to determine an overall suitability score (see below), it only makes sense to make the replacement if the resulting suitability improvements are greater than the overhead. Replacement overhead can thus increase the decision threshold above just cost considerations alone. These aspects will be described in further detail below.

Each exemplary embodiment for making dynamic service and application placement decisions at either the edge or at the core is now described in detail. In each case, an exemplary system architecture for both the edge and for the core is provided.

Making Service/Application Placement Decisions at the Edge:

The edge device will compare the cost of serving a user's request locally (such as launching service cost and the risk of blocking future arrival requests) and the cost of serving the request at the core. The concept of "cost" is used herein to represent the overall goodness of serving a request at a particular location (edge/core). Cost is a function of user's Quality of Experience (QoE) metrics such as job completion time as well as network provider's resource consumption such as CPU/memory and network bandwidth. In order to calculate the cost, many factors are considered such as the request specifications, e.g., response time requirement and computational demand (job size), as well as the mobility patterns of users. For example, by exchanging information with neighboring edge devices, the edge device of interest can estimate the volume of new users that are moving towards its coverage area and their application and service requests. This process for computing cost is described in detail below.

If serving the current request will consume a vast amount of local resources and may cause incoming delay-sensitive service requests to be redirected to the core, which may introduce longer round trip transmission delay, it is advantageous to serve the current request at the core in order to reserve the resources for the bulk of incoming service requests. Another example of utilizing mobility information is that if the current user is moving at a fast speed and will handover to a different edge device momentarily, it is better to serve the current request at the core rather than the edge, even if there are sufficient local resources available, in order to save the costly transmission overhead of application state migration among adjacent edge devices introduced by handover.

Figure 5:
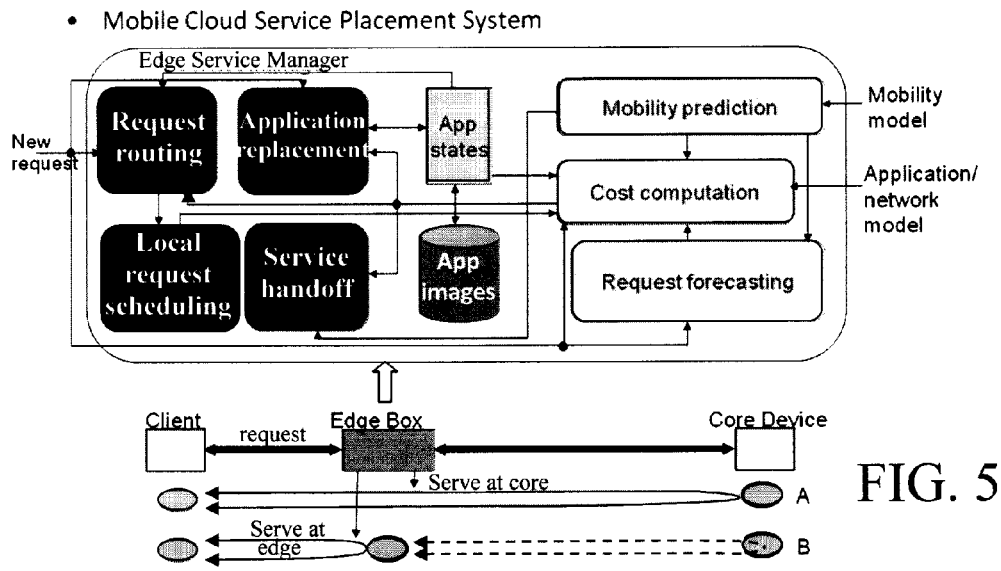
FIG. 5 is a schematic diagram illustrating an exemplary internal structure of edge modules in the case where the placement decisions are made at the edge according to an embodiment of the present invention.

According to an exemplary embodiment, implementation of the present techniques utilizes a set of modules to be implemented at the edge server and another set to be implemented at the core server. FIG. 5, for example, illustrates an example of the internal structure of the edge modules.

As shown in FIG. 5, the system architecture at the edge includes an Edge Service Manager which in this exemplary embodiment makes the service/application placement decisions (i.e., whether to serve a request at the edge or at the core) based on input, such as models of the cellular network, user mobility patterns, and/or service/application profile, and runtime states at the edge servers. See, for example, the description of the system architecture at the core, below. The Edge Service Manager shown in FIG. 5 is representative of one of a plurality of Edge Service Managers present at the network edge. See, for example, FIG. 6 described below. The Edge Service Manager(s) may be run on one or more edge servers of the network.

The Edge Service Manager includes a request routing module which receives user requests and a request scheduler. As described above, the present techniques involve a cost evaluation which considers the cost of serving a request at the edge and the cost of serving the request at the core. This cost computation is performed by the cost computation module which receives as input data regarding user mobility patterns (from a mobility prediction module) and a prediction of user request patterns (from a request forecasting module). As highlighted above, the cost computation is based on models of the cellular network and the application profile, and of user mobility patterns (e.g., via the mobility prediction module). These models will be described in detail below.

Based on the cost computation, the request routing module will (as described in detail below) make the decision to either service the request at the edge servers or at the core. An application state module (labeled "App states") will maintain a current status of the applications being run at the edge, and those run at the core. A database of application images (labeled "App images") is preferably maintained which can be accessed by the application state module that catalogues those applications being run at the edge or at the core.

Based on the service decisions made by the edge Service Manager for current user requests, it may be necessary to change those requests being serviced at the edge (via an application replacement module) and/or forward one or more of the requests to the core (via a service handoff module). The core system architecture for implementing the present edge-based decision process example is now described by way of reference to FIG. 6.

Figure 6:
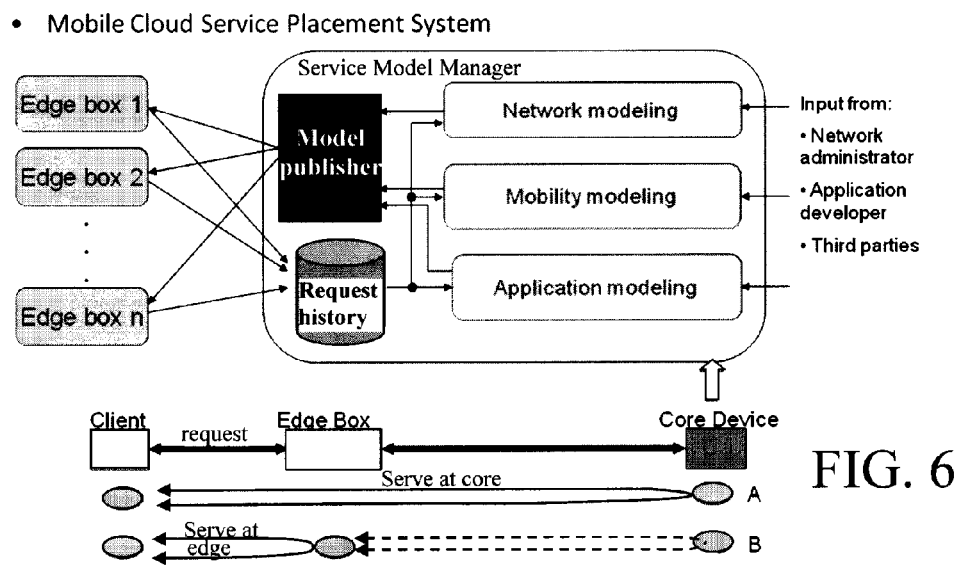
FIG. 6 is a schematic diagram illustrating an exemplary internal structure of core modules in the case where the placement decisions are made at the edge according to an embodiment of the present invention.

As shown in FIG. 6, the core server manages the cellular network, user mobility and application profile models (and input to the models) via a Service Model Manager, which then provides this model data to the Edge Service Manager (see FIG. 5) for use in the above-described cost computation analysis. Specifically, as shown in FIG. 6, the Service Model Manager includes a network modeling module, a mobility modeling module and an application modeling module, for use in providing cellular network, user mobility and application profile models, respectively. To create the models, these modules can receive as input data from network administrators, applications developers and/or other relevant third parties (such as application developers for application models and/or other third parties, e.g., GPS user traces—see below). The modules can also leverage historical request data from a request history database. As shown in FIG. 6, the request history database preferably maintains a record of past requests for each of the Edge Service Managers in the network. Thus, the present techniques can learn from request history, including what application/services were requested, from what user, which edge box the requests were submitted to and at what time, and the performance (response time) and resource consumption (CPU/memory/network bandwidth) of serving the requests.

A description of the cellular network, user mobility and application profile models used in making the application placement decisions is now provided. The cellular network topology is readily available from the given network provider. It is notable that in the description that follows, network topology, network performance models, and network usage models all fall under the category of cellular network models; user mobility patterns in cellular networks fall under the category of user mobility models; and mobile application profiling falls under the category of application profile models.

Network usage modeling is useful in ascertaining network traffic and can be used to predict usage patterns in the future. Exemplary techniques for network modeling which may be used in accordance with the present techniques are described, for example, in U.S. Pat. No. 8,352,392 issued to Swift et al., entitled "Methods and System for Modeling Network Traffic" the contents of which are incorporated by reference herein, which employs artificial neural network architecture to model the capacity of a network. Network performance may also be modeled using commercially available tools such as the IBM Netcool Network Analytics V1.1.

User mobility models serve to predict the location of users in a network. Suitable user mobility models that may be used in accordance with the present techniques are described, for example, in U.S. Pat. No. 8,369,876 issued to Bachmann et al., entitled "Mobility Management in Communication Networks," the contents of which are incorporated by reference herein, which provides techniques for finding user mobility patterns in cellular networks. See also, C. Schindelhauer, "Mobility in Wireless Networks," Proceedings of the 32$^{nd}$ conference on Current Trends in Theory and Practice of Computer Science SOFSEM'06, pgs. 100-116 (January 2006) the contents of which are incorporated by reference herein, which surveys mobility patterns and mobility models for wireless networks.

Application profile models provide information regarding the applications being run on the network, such as performance, application inefficiency, etc. Suitable application profile models for use in conjunction with the present techniques are described, for example, in Qian et al., "Profiling Resource Usage for Mobile Applications: A Cross-layer Approach," Proceedings of the 9$^{th}$ International Conference on Mobile Systems, Applications, and Services, MobiSys'11, Jun. 28-Jul. 1, 2011 the contents of which are incorporated by reference herein (which describes a mobile application resource optimizer tool for exposing the cross-layer interaction among various layers in the network); A. Alvarez et al., "Mobile application profiling with Testel- Droid," 2012 IEEE Consumer Communications and Networking Conference (CCNC) (January 2012) the contents of which are incorporated by reference herein (which profiles the performance of mobile applications and services from the user level); and Diaz et al., "Mobile Application Profiling for Connected Mobile Devices," Pervasive Computing, IEEE, vol. 9, issue 1 (January-March 2010) the contents of which are incorporated by reference herein (which addresses mobile application resource consumption performance).

According to an exemplary embodiment, the present techniques support three means for obtaining the models (network, user mobility, application profile) required by the mobility prediction and cost computation modules (see FIG. 5): (a) direct input from network administrator (as provided above—the network administrator can provide information regarding a particular cellular network, e.g., network topology, link capacities, computation capacities (CPU, memory, storage, etc.) at edge/core servers, round-trip times (RTTs) between edge and core servers); (b) programmatic input from third parties such as application developers (e.g., computational demand per request used for building the application model) and other third parties (e.g., user GPS traces used for building user mobility model); (c) learning from request history, including what application/services were requested, from what user and to which edge box the requests were submitted and at what time, and the performance (e.g., response time) and resource consumption (e.g., CPU/memory/network bandwidth) of serving the requests. This information learned from the request history can be processed to infer aggregate properties of the application, including but not limited to application request rate (number of requests per unit time) and how the rate is distributed over different edge boxes and different times of the day/week, as well as the amount of computational resources (e.g., CPU, memory, bandwidth) consumed per request; note that the resource consumption generally differs based on whether the request is served from the edge or the core. By way of example only, network administrators can input model parameters and/or they can be provided with a list of existing models pre-constructed based on typical settings in cellular networks from which they can pick and/or customize. Global positioning system (GPS) traces can be used to track/map user mobility. See, for example, Schroedl et al., "Mining GPS Traces for Map Refinement," Data Mining and Knowledge Discovery, 9, 59-87 (2004), the contents of which are incorporated by reference herein.

An additional feature enabled by the Service Model Manager is selection/adaptation of models. This is done through the model publisher module. See FIG. 6. Specifically, the model publisher module publishes selected models to each edge server based on the local attributes at the edge server (e.g., time zone, location, energy cost). By way of example only, the model publisher module may publish only a subset of the global network model pertaining to a particular edge box (e.g., computational capacities of this edge server and the corresponding core server(s) that may process requests on behalf of the edge server, RTT and bandwidth from this edge server to the core server, etc.) to the corresponding edge server. The model publisher may also publish a customized mobility/application model to an edge server that represents local user mobility/application characteristics experienced by the edge server, although application characteristics are usually identical for different servers. It is possible that multiple models of the same type (network/mobility/application) are published to the same edge server, in which case the publisher also annotates the conditions for using each alternative model. For example, it will be beneficial to have separate mobility models to capture different user mobility patterns at different hours of a day or different days of a week.

Figure 7:
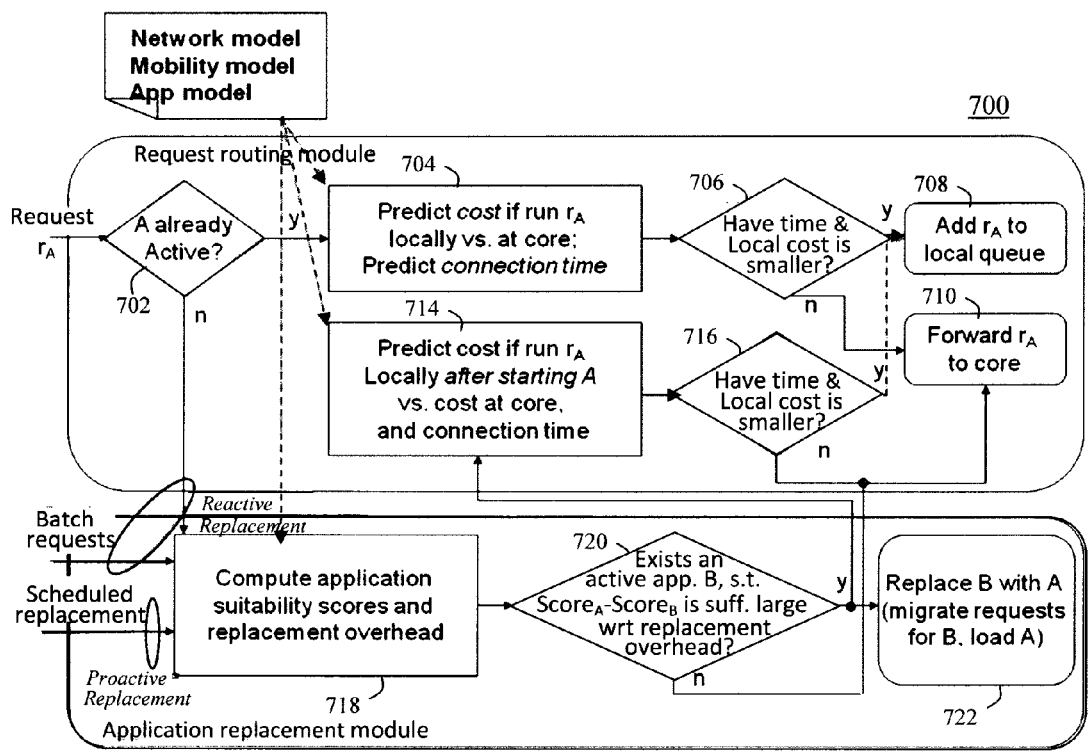
FIG. 7 is a diagram illustrating an exemplary methodology for making a request service decision at an edge server according to an embodiment of the present invention.

FIG. 7 provides an exemplary methodology 700 for making a request service decision by comparing the cost of (1) serving the current request locally or (2) forwarding it to the core (Request routing module). In this exemplary embodiment, methodology 700 is performed by the edge server(s). However, essentially the same evaluation process is performed when the decision process is performed at the core (see FIG. 10, described below. Methodology 700 also gives an example of a parallel decision process to determine which applications to activate at the edge device and which ones to deactivate/replace (Application replacement module). Both processes make use of the (mobility, application and network) models obtained by the Service Model Manager at the core (see description of FIG. 5, above).

This process invokes subroutines to evaluate various decision factors such as service cost and suitability score. Namely, based on receipt of a user request r for an application A, a determination is made in step 702 as to whether application A is already active at the edge server. This runtime state factor of the edge servers is also referred to herein as an application (or service) state (i.e., active or inactive). As provided above, other runtime state data may also be obtained. If the application A is not already active at the edge server, then in step 704 a prediction is made as to what the cost would be to run the application A locally at the edge server versus running the application at the core.

As provided above, the present techniques use the concept of "cost" to represent the overall goodness of serving a request at the edge or at the core. Cost is a function of user's Quality of Experience (QoE) metrics such as job completion time as well as network provider's resource consumption such as CPU/memory and network bandwidth. QoE is further described in ETSI Technical Report 102 643 V1.0.2 (January 2010) the contents of which are incorporated by reference herein.

In order to calculate the cost, factors such as the request specifications, e.g., response time requirement and computational demand (job size), as well as the mobility patterns of users can be considered—for which the mobility model(s) obtained by the Service Model Manager can be employed. For example, one possible cost function is a (weighted) sum of response time and resource cost computed as a (weighted) sum of all of the computational resources consumed for processing a request (amounts of CPU, memory, bandwidth consumed). Note that the cost function needs to be separately defined for serving the request from the edge server and serving it from the core server as the response time and resource consumption may differ (e.g., core server has faster CPU but longer round-trip time (RTT) to mobile device). Another example of the cost function also includes queueing delay that the request spends waiting for previously submitted request to be completed (i.e., replacing response time by the sum of response time and queueing delay). In yet another example, the mobility model can be used to estimate the volume of new users that are moving towards the coverage area which factors into the cost of serving a request of application A at the edge versus at the core. This is done by applying the above cost function to not only the current request (of application A) under consideration, but also to the requests in the near future (e.g., from about 5 minutes to about 30 minutes from the current time) predicted from the mobility model, and using the combined total cost as the cost of serving the current request from the edge (or core).

According to an exemplary embodiment, cost of running an application at the edge is computed using a user-defined cost function that combines user QoE and provider resource consumption (i.e., computational demand) as described above, wherein the cost of running a request at an edge device is the absolute cost of running all current requests in the queue of the edge device together with the newly arrived request minus the absolute cost of running only the current requests. For instance, the given cost function is used to calculate $C_1$ (which is the cost of all current requests plus a new request $r_A$) and $C_2$ (which is the cost of current requests—without $r_A$). The cost of running $r_A$ is equal to $C_1$-$C_2$. The same cost function can also be used to compute the cost of running the application at the core, wherein the cost of running a request at the is the absolute cost of running all current requests in queue at the core together with the newly arrived request minus the absolute cost of running only the current requests. This cost calculation can be extended to current and future requests if request prediction data is available.

Further, in step 704, a prediction of the connection time is made. Connection time is the elapsed time during which the user is connected with the edge box the user is currently associated with. Thus, in this case, a determination is made as to how long the user requesting application A will be connected with the current edge server. For example, this can be estimated from the expected connection time based on historical connection times with this edge server, or from user location, speed, direction of movement, and the coverage area of the edge box (location/speed/direction can be estimated from user GPS traces and/or recent association with neighboring edge boxes; the connection time can be estimated by dividing the remaining distance within coverage, computed from user location/direction of movement and the coverage area, by the speed). The concept being exploited here is that a fast-moving user is likely to have short connection times with each edge server and is therefore better served by the core. Further, determining the connection time is important since, given the queue of requests at the edge device, there might not be enough time to service the request (even if the cost is overall less to run the request locally at the edge).

Based on the cost and connection time predictions made in step 704, in step 706 a determination is made as to whether there is time to service the request locally at the edge, and if so, is the cost of running the application A locally at the edge smaller than running the application A at the core. If the answer to these questions is yes, i.e., there is sufficient time to run the application A at the edge and the local cost is smaller, then as per step 708, the request will be serviced at the edge and $r_A$ is added to the local queue. On the other hand, if there is either insufficient time to run the application A at the edge and/or the local cost is greater, then as per step 710, the request will be serviced at the core and $r_A$ is forwarded to the core.

Optionally, this service handoff might alternatively involve forwarding the request to another edge server over the core if that is more cost-effective. For example, upon a handoff of a user u (e.g., as in step 710), u's requests currently being served at edge server E can be migrated to edge server E' or to the core server, whichever gives the lower cost. The present cost calculations were described above. If U is handed off to E', then u's requests in the queue of E can be transferred to E' as new requests. Further, in this case, u's handed-off requests might optionally be given priority over first-time requests to edge server E'.

Referring back to step 702, if (contrary to above) it is determined in step 702 that the application A is not already active at the edge, then as described in detail below that triggers an evaluation process as to whether the application A should replace an existing application (e.g., application B) already running at the edge (and if the determination is made that the replacement should not be instituted then the application A is directly routed to the core).

Specifically, when application A is not already active at the edge, then a replacement checking/evaluation is instituted and as per step 718 application suitability scores are computed for i) application A inactive/application B active and for ii) application A active/application B inactive. Basically, the goal is to evaluate the scenarios of replacing versus not-replacing application B with application A. The process for computing the cost of running the application A locally at the edge, versus at the core, was provided above. These cost calculations are used to calculate the suitability score which provides a gauge of the goodness of running an application at the edge as a function of a cost of running the application at the edge/core, popularity, hit ratio, etc.

For instance, in one exemplary embodiment, the suitability score is calculated by subtracting the cost of execution (of the application) at the edge from the cost of execution (of the application) at the core and then multiplying by the rate of requests that can be served by the edge, which quantifies a cost savings per unit time. Further, the evaluation made at step 718 takes into account the application replacement overhead. Basically, there is a cost associated with replacing application B with application A, as compared to maintaining the status quo. Thus, in order to evaluate whether (or not) to replace one application with another, the benefits (in terms of a potential increase in the suitability score) has to be offset by the overhead associated with the change. According to an exemplary embodiment, the application replacement overhead (i.e., the cost of replacing application B with application A) is represented as the sum of the cost to migrate current requests to the application to be replaced (application B), and the cost to load the new application (application A).

Accordingly, in step 720, a determination is made as to whether the suitability score (achieved by replacing for example existing, active application B with application A) less the replacement overhead is greater than if the status quo was maintained (i.e., application A is inactive/application B is active). For example, application A should be replaced by application B if the suitability score of application A (i.e., score (A)) less the suitability score of application B (i.e., score (B)) is sufficiently large with respect to the overhead. Namely, if:

$$\text{score}(A)-\text{score}(B)>\text{overhead}/T$$

the savings exceeds the overhead in time T, then in step 722, application B is replaced with application A, application A is loaded at the edge, and requests for application B are sent to the core.

On the other hand, if in step 720 it is determined that:

$$\text{score}(A)-\text{score}(B)<\text{overhead}/T$$

the overhead exceeds the savings in time T, then the status quo (i.e., keeping application B active at the edge) is maintained. As shown in FIG. 7, in that case, the request $r_A$ is forwarded directly to the core.

In the exemplary embodiment shown in FIG. 7, steps 718-722 are performed by the application replacement module. See FIG. 5. Further, as shown in FIG. 7, the replacement decision process can be performed in response to an incoming user request for an application (i.e., $r_A$ as provided above). This is referred to herein as reactive replacement. Additionally, the same evaluation process can be performed on a regular basis (i.e., scheduled replacements) for one or more of the applications running at the edge, e.g., to determine whether replacing one application with another can serve to increase the suitability score. This is referred to herein as proactive replacement.

Referring back to the scenario where, based on the evaluation performed in step 720, the decision is made to replace application B with application A, the next steps in the process are used to determine the cost of running $r_A$ at the edge versus at the core. Namely, this cost evaluation is only performed for those replacement scenarios where the decision has already been made that the suitability score increase is sufficiently great enough to warrant the replacement. As provided above, all other (non-qualifying replacement requests) are forwarded directly to the core, without any additional cost analysis.

The cost analysis now performed for these replacement scenarios in steps 714 and 716 mirrors that described in conjunction with steps 704 and 706, respectively, above. Namely, for those requests $r_A$ that are given the green light for replacement (in step 720), in step 714 a prediction is made as to what the cost would be to run the application A locally at the edge server after starting A versus running the application at the core. Here the cost evaluation takes into account the time it takes to replace the application (i.e., predict cost of running $r_A$ locally after starting A). This is because the evaluation process (i.e., to determine whether or not to replace an application) is usually fast, but the actual application replacement takes substantial time (e.g., time to migrate existing requests of B to core/other edge servers, time to load image of A into memory, etc.). For a fair comparison with routing request $r_A$ to the core, this time also needs to be taken into account (added to the total response time for processing $r_A$ at the edge).

The above-described user-defined cost function may be employed in step 714, i.e., wherein the cost of running a request at an edge device is the absolute cost of running all current requests in the queue of the edge device together with the newly arrived request minus the absolute cost of running only the current requests and/or the cost of running a request at the core is the absolute cost of running all current requests in queue at the core together with the newly arrived request minus the absolute cost of running only the current requests. Further, in step 714, a prediction of the connection time is made. See above.

Based on the cost and connection time predictions made in step 714, in step 716 a determination is made as to whether there is time to service the request locally at the edge, and if so, is the cost of running the application A locally at the edge smaller than running the application A at the core. If the answer to these questions is yes, i.e., there is sufficient time to run the application A at the edge and the local cost is smaller, then as per step 708, the request will be serviced at the edge and $r_A$ is added to the local queue. On the other hand, if there is either insufficient time to run the application A at the edge and/or the local cost is greater, then as per step 710 the request will be serviced at the core and $r_A$ is forwarded to the core.

According to the exemplary embodiment shown in FIG. 7, steps 702-716 are performed by the request routing module of the edge device. See, for example, FIG. 5 described above. As described above, the decision process for replacing applications (steps 718-722) is performed by the application replacement module.

It is also notable that the above-described network, mobility and application models are factored into key points of the decision process. For instance, as highlighted above, these models factor into determining the cost (e.g., of running an application locally at the edge versus at the core). Further, since the suitability calculation also takes into account this cost concept, it too leverages data gleaned from the models.

FIGS. 5-7 focus on the placement decision process being performed at the edge. An exemplary embodiment is now provided wherein the present techniques are instead implemented at the core. Either configuration (evaluation at the edge or at the core) is suitable for use in accordance with the present teachings.

Making Service/Application Placement Decisions at the Core:

When a request arrives, it can be satisfied at the edge or the core depending on the location of the data and service. The case was considered above where the applications at the edge can be dynamically loaded/replaced. Here we consider adaptively placing the data and computation at the edge network or the core network depending on a variety of factors, as described below.

As provided above, a core idea of the present techniques is to incorporate three unique features of the cellular domain: (a) unique tree-like topology of cellular networks; (b) patterns of user mobility; (c) large disparity in performance/cost ratio of servers towards the edge versus servers in the core network. By exploiting these three unique characteristics, a substantial performance improvement can be realized over prior systems of application and service placement which have been implemented for overlay networks and cloud data centers. In addition to adaptively loading/replacing applications at the edge of the network (as described above), the enterprise can make placement requests such that the core network can adaptively push data and/or computation to the edge depending on the nature of the request, computation/storage available at the edge, user roaming, and enterprise policies. See, for example, FIG. 3 (described above) which illustrates an exemplary embodiment wherein data and service placement decisions in a mobile cloud are made at the core network.

The idea here is to utilize the mobility information and the application and service request specifications to make the dynamic service and application placement decisions. The core device will compare the cost of serving the request locally (such as launching service cost and the risk of blocking future arrival requests) and the cost of serving it at the edge. The concept of cost, as used herein, and the process for computing cost were described in detail above.

Consider the example of Lotus Notes accessed by a mobile user. In this case, several databases (DBs) could be in use (email DB, contact list DB, patent DB, etc.). With the techniques presented herein, the core network can distribute parts of the DB that are likely to be accessed by the mobile user (for example fresh emails). In deciding which portions of the DB to fetch at the edge server, ratio of input/output data volume is taken into account. The ratio of input/output data volume is the amount of input data in the DB required to perform the requested operation, divided by the amount of output data produced by this operation that needs to be returned to the user. For instance, when a user is composing an email, the contact list need not be pushed to the edge. Instead, when the user starts composing the email with the recipient address (to: John Doe), the edge requests for contact completion from the core. Here, the one-time communication cost of requesting the core to fetch the contact outweighs the storage cost of importing the entire contact list at the edge server. On the contrary, storing the email database that the user would access more frequently at the edge storage would reduce email latency.

Figure 8:
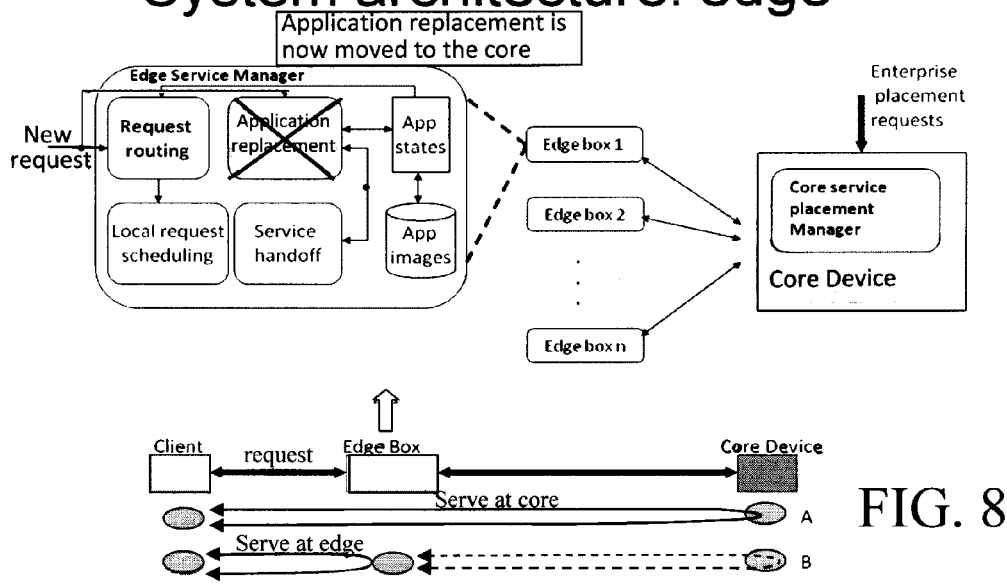
FIG. 8 is a schematic diagram illustrating an exemplary internal structure of edge modules in the case where the placement decisions are made at the core according to an embodiment of the present invention.

As above, implementation of this exemplary embodiment of the present techniques utilizes a set of modules to be implemented at the edge server and another set to be implemented at the core server. FIG. 8, for example, illustrates an example of the internal structure of the edge modules.

As shown in FIG. 8, the system architecture at the edge also includes an Edge Service Manager. However, by comparison with the example provided above where the placement decisions were made by the Edge Service Manager, here the placement decision process resides with the core. The Edge Service Manager, which as shown in FIG. 8 may be run on one or more edge servers of the network, includes a request routing module which receives user requests and a request scheduler. An application state module (labeled "App states") will maintain a current status of the applications being run at the edge, and those run at the core.

As above, a database of application images (labeled "App images") is maintained at the edge device which can be accessed by the application state module that catalogues those applications being run at the edge or at the core. According to the present techniques, a large number of application images can be stored in the database, while only a select few are activated at run time based on user needs.

Based on the service decisions made by the core for current user requests, it may be necessary to replace one or more of the applications running on the edge devices. In the above example (i.e., edge-based decision making), an application replacement module is responsible for the replacement decision. See, for example, FIG. 7, described above. By comparison, in this example (core-based decision making) the application replacement decision capabilities are shifted to the core. Accordingly, as shown in FIG. 8, an application replacement module is unnecessary at the edge devices. A service handoff module may, however, be implemented at the edge to service any replacement decisions (that are made at the core).

FIG. 8 also highlights how, in this example, the enterprise placement requests (i.e., placement at the edge or at the core) are processed at the core device. As will be described in detail below, the core device includes a Core Service Placement Manager. The Core Service Placement Manager performs an analogous function to the Edge Service Manager (see above). The placement decisions made at the core control which applications are run at the core and at each edge box in the network.

With conventional processes, applications are hand-picked to run at the edge. This is inefficient, static and not fine-tuned. By comparison, according to the instant exemplary embodiment, the core can push content and computation to edge devices based on user demand and mobility. The system architecture at the core device for implementing the exemplary (core-based) decision making process is now described by way of reference to FIG. 9.

Figure 9:
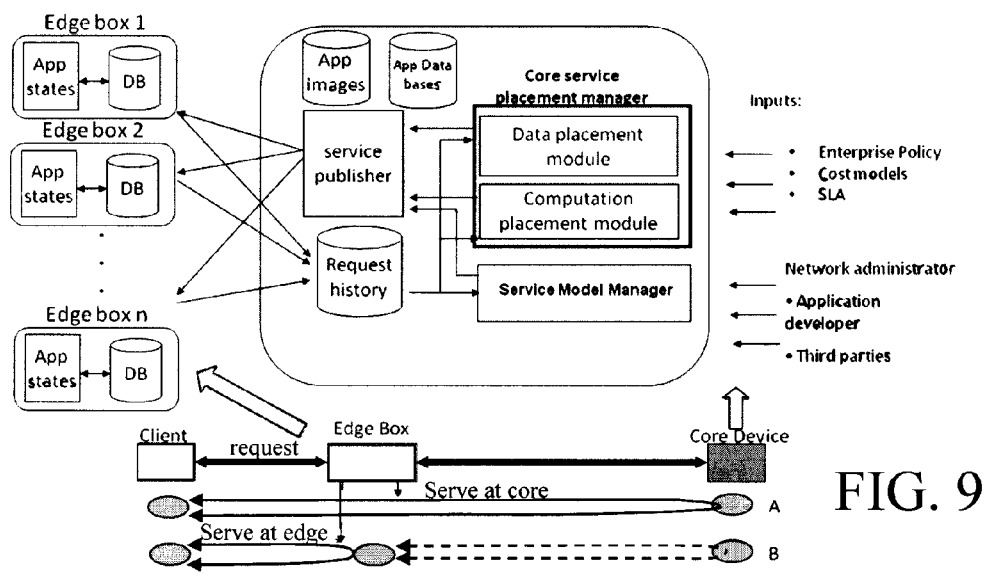
FIG. 9 is a schematic diagram illustrating the system architecture at the core device for implementing the exemplary (core-based) decision making process according to an embodiment of the present invention.

Implementation of the present (core-based) decision making process requires a set of modules to be implemented at the core server. FIG. 9 provides an example of the internal structure of the core modules. As highlighted above, the Core Service Placement Manager in this example controls which applications are run at the core and which are run at the edge. As shown in FIG. 9, the Core Service Placement Manager includes two sub-modules: a) a Data placement module and b) a Computation placement module. The Service Model Manager operates in the same manner as described in conjunction with the (edge-based) decision-making embodiment above. Namely, the Service Model Manager manages the cellular network, user mobility and application profile models (and input to the models).

The Data placement module and the Computation placement module accept inputs in the form of enterprise security and cost policies. Enterprise security policies can dictate, for example, whether certain applications can be run at the edge servers, or whether doing so would violate a security policy. In the latter case, the decision is made then to run the application at the core.

Specifically, the Core Service Placement Manager makes the decision to: 1) distribute local data to the edge devices to support user data access vs. maintaining the data at the core (i.e., via the Data placement module), 2) process computation at the edge to lower response latency vs. perform the computation at core where there is access to the entire data (i.e., via the Computation placement module). For example, when a request at the edge device does not have enough local data to be computed accurately, the request can be a) routed to core, b) computed locally to produce inaccurate results due to insufficient/stale data, or c) data can be fetched from core. These decisions are made by the Core Service Placement Manager based on storage and computation available at the edge, enterprise policies for data placement (e.g., security policies), application requirements and/or popularity.

The core modules can also leverage historical request data from a request history database. The request history database preferably maintains a record of past requests for each of the edge servers. Thus, the present techniques can learn from request history, including what application/services were requested, from what user, to which edge box the requests were submitted and at what time, and the performance (response time) and resource consumption (CPU/memory/network bandwidth) of serving the requests.

An application database (labeled "App Data bases") will maintain a current status of the applications being run at the edge, and those run at the core. A database of application images (labeled "App images") is used to store a large number of application images. From those large numbers of application images stored, only a few need to be activated at run time based on user needs. As shown in FIG. 9 (and as described in conjunction with the description of FIG. 8, above) each edge device also maintains an application images database of those applications being run at the edge and those being run at the core. It is notable that in a core-based solution, the role of application replacement is performed by the core service placement manager, which computes the right services to run at each edge (with the remainder being run at the core). This decision is then pushed to the edge device by the service publisher. See FIG. 9.

As described in conjunction with the description of FIG. 7 above, essentially the same process is employed when the service decision is made at the core (as opposed to at the edge) by comparing the cost of (1) serving the current request locally or (2) in this case forwarding it to the edge. However, for completeness, the core-based decision process is illustrated as methodology 1000 in FIG. 10. Many of the concepts employed in methodology 1000 have already been discussed in detail and, where noted, reference should be made to the description of FIG. 7 above. In this exemplary embodiment, methodology 1000 is performed by the core server.

As with requests served at the edge, those served by the core can be evaluated using the same set of performance factors (e.g., amount of compute/bandwidth required). The core can also log the request history to compute/re-compute what applications to run at the edge, triggering application replacement if necessary.

Figure 10:
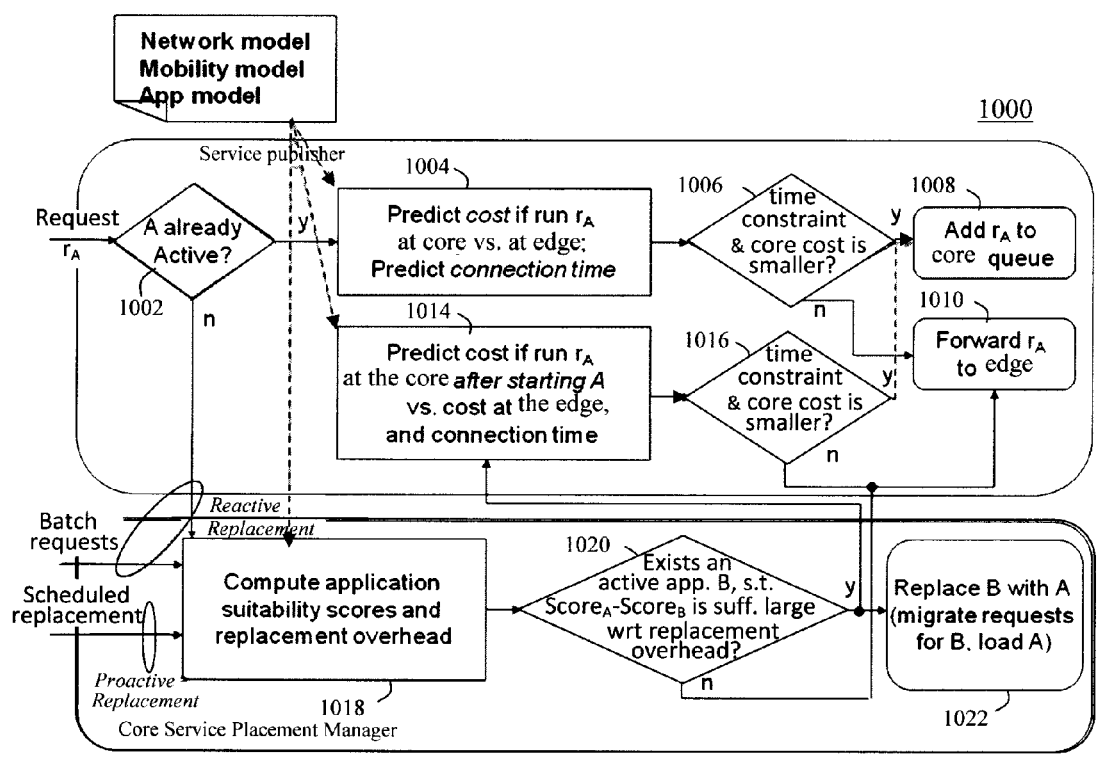
FIG. 10 is a diagram illustrating an exemplary methodology for making a request service decision at a core server according to an embodiment of the present invention.

As shown in FIG. 10, based on receipt of a user request $r$ for an application A, a determination is made in step 1002 as to whether application A is already active at the core (i.e., a runtime state factor of the core server). If the application A is not already active at the core, then in step 1004 a prediction is made as to what the cost would be to run the application A locally at the core versus running the application at an edge server. The concept of 'cost' and how it is computed—including suitable cost functions—were described in detail above.

In step 1004, a prediction of the connection time is also made. As described above, connection time is the elapsed time during which the user is connected with the edge box the user is currently associated with. Techniques for determining connection time were described in detail above. The concept being employed here is that a fast-moving user is likely to have short connection times with each edge server and is therefore better served by the core. Connection time is evaluated with respect to the edge even if service placement is decided by the core (in core-based solution), the edge is still the first stop of a request and one needs to look at cost and connection time to decide whether to run the request locally or from core (under the condition that the requested application is already running at the edge).

Based on the cost and connection time predictions made in step 1004, in step 1006 a determination is made as to whether there are connection time constraints (e.g., short connection times—see above) and/or is the cost of running the application A at the core smaller than running the application A at the edge. If the answer to either (or both) of these questions is yes, then as per step 1008, the request will be serviced at the core and $r_A$ is added to the core server queue. On the other hand, if there is both sufficient time to run the application A at the edge and the local cost is smaller (see description of FIG. 7, above), then as per step 1010, the request will be serviced at the edge and $r_A$ is forwarded to the edge. The intention here is to use "cost" as comprehensive measure of how efficient the request can be served. Hence, in the case where there is enough time to service the request at the edge but it is more cost effective to send the request to the core, the request will still be routed to core. Enough connection time is just a necessary condition for running it from the edge. In other words, if the connection time is too short, the request will be routed it to the core. If the connection time is expected to be longer, then the other various cost metrics discussed herein may be considered.

Referring back to step 1002, if (contrary to above) it is determined in step 1002 that the application A is not already active at the edge, then as described in detail below that triggers an evaluation process as to whether the application A should replace an existing application (e.g., application B) already running at the edge (and if the determination is made that the replacement should not be instituted then the application A is directly routed to the edge).

Specifically, when application A is not already active at the core, then a replacement checking/evaluation is instituted and as per step 1018 application suitability scores are computed for i) application A inactive/application B active and for ii) application A active/application B inactive. As described above, the goal here is to evaluate the scenarios of replacing versus not-replacing application B with application A.

As above, the suitability score may be calculated by subtracting the cost of execution (of the application) at the core from the cost of execution (of the application) at the edge and then multiplying by the rate of requests that can be served by the core, which quantifies a cost savings per unit time. The evaluation made at step 1018 further takes into account the application replacement overhead (i.e., the cost associated with replacing application B with application A, as compared to maintaining the status quo—see above). Thus, in order to evaluate whether (or not) to replace one application with another, the benefits (in terms of a potential increase in the suitability score) has to be offset by the overhead associated with the change. As above, the application replacement overhead (i.e., the cost of replacing application B with application A) can be represented as the sum of the cost to migrate current requests to the application to be replaced (application B), and the cost to load the new application (application A).

Accordingly, in step 1020, a determination is made as to whether the suitability score (e.g., by replacing active application B with application A) less the replacement overhead is greater than if the status quo is maintained (i.e., application A is inactive/application B is active). If, as provided above, the suitability score of application A less the suitability score of application B is sufficiently large with respect to the overhead, then in step 1022, application B is replaced with application A, application A is loaded at the core, and requests for application B are sent to the edge.

On the other hand, if in step 1020 it is determined that the costs of replacement exceeds the benefit (i.e., the suitability score of application A less the suitability score of application B is less than the overhead, then the status quo (i.e., keeping application B active at the core) is maintained, and the request $r_A$ is forwarded directly to the edge.

In the exemplary embodiment shown in FIG. 10, steps 1018-1022 are performed by the Core Service Placement Manager. As provided above, the applications that are not pushed to the edge, and need to be served, will be running at the core. Further, as shown in FIG. 10, the replacement decision process can be performed in response to an incoming user request for an application (i.e., $r_A$ as provided above). This is referred to herein as reactive replacement. Additionally, the same evaluation process can be performed on a regular basis (i.e., scheduled replacements) for one or more of the applications running at the core, e.g., to determine whether replacing one application with another can serve to increase the suitability score. This is referred to herein as proactive replacement.

Referring back to the scenario where, based on in the evaluation performed in step 1020, the decision is made to replace application B with application A, the next steps in the process are used to determine the cost of running $r_A$ at the core versus at the edge. This cost evaluation is only performed for those replacement scenarios where the decision has already been made that the suitability score increase is sufficiently great enough to warrant the replacement. As provided above, all other (non-qualifying replacement requests) are forwarded directly to the edge, without any additional cost analysis.

The cost analysis now performed for these replacement scenarios in steps 1014 and 1016 mirrors that described in conjunction with steps 1004 and 1006, respectively, above. Namely, for those requests $r_A$ that are given the green light for replacement (in step 1020), in step 1014 a prediction is made as to what the cost would be to run the application A locally at the edge server after starting A versus running the application at the core. Here the cost evaluation takes into account the time it takes to replace the application (i.e., predict cost of running $r_A$ locally after starting A). This is because evaluation process (i.e., to determine whether or not to replace an application) is usually fast, but the actual application replacement takes substantial time (e.g., time to migrate existing requests of B to core/other edge servers, time to load image of A into memory, etc.). As provided above, this time is taken into account to insure a fair comparison with routing request $r_A$ to the edge.

The above-described user-defined cost function may be employed in step 1014, i.e., wherein the cost of running a request at the core is the absolute cost of running all current requests in the queue of the core together with the newly arrived request minus the absolute cost of running only the current requests and/or the cost of running a request at the edge is the absolute cost of running all current requests in queue at the edge together with the newly arrived request minus the absolute cost of running only the current requests. Further, in step 1014, a prediction of the connection time is made as described above. Based on the cost and connection time predictions made in step 1014, in step 1016 a determination is made as to whether there are connection time constraints (e.g., short connection times—see above) and/or is the cost of running the application A at the core smaller than running the application A at the edge. If the answer to either (or both) of these questions is yes, then as per step 1008, the request will be serviced at the core and $r_A$ is added to the core server queue. On the other hand, if there is both sufficient time to run the application A at the edge and the local cost is smaller, then as per step 1010 the request will be serviced at the edge and $r_A$ is forwarded to the edge. Namely, as provided above, the connection time at the edge will be evaluated first no matter whether the edge or core makes the placement decision, since if the connection time is too short to place the application on the edge, it must be served at the core. Other decision processes can then be executed if an application can be served either at the edge or at the core.

According to the exemplary embodiment shown in FIG. 10, steps 1002-1016 are performed by the Service Publisher. See, for example, FIG. 9 described above. As described above, the decision process for replacing applications (steps 1018-1022) is performed by the Core Service Placement Manager.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Figure 11:
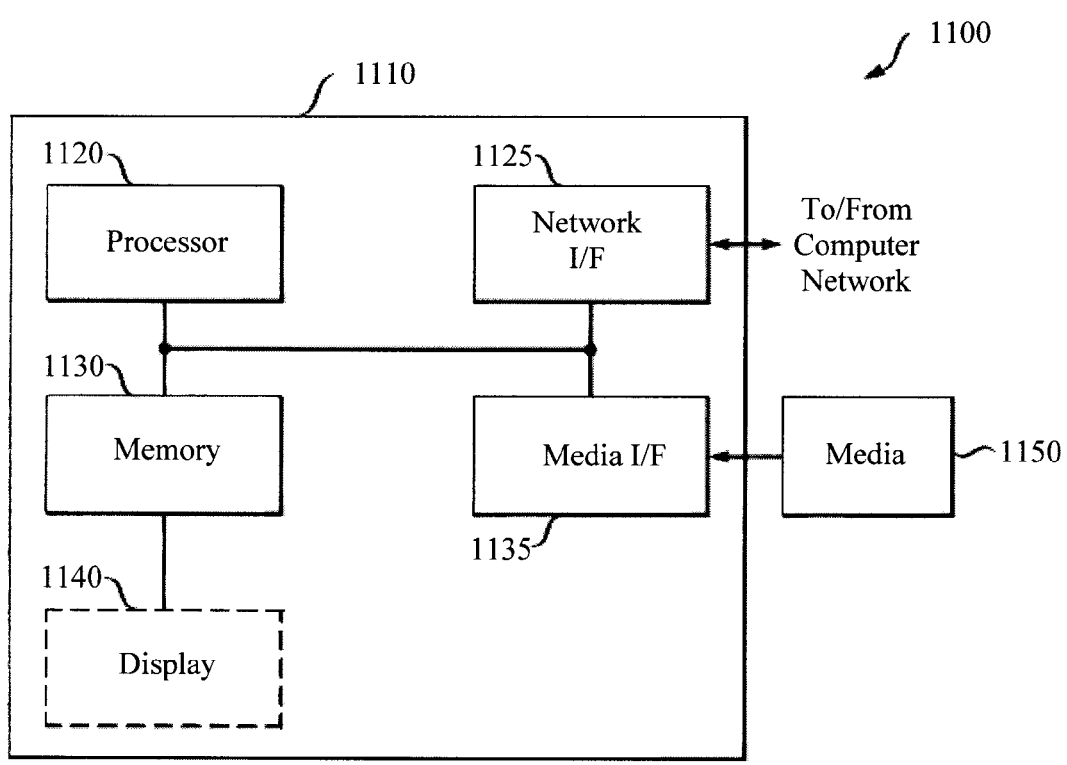
FIG. 11 is a diagram illustrating an exemplary apparatus for performing one or more of the methodologies presented herein according to an embodiment of the present invention.

Turning now to FIG. 11, a block diagram is shown of an apparatus 1100 for implementing one or more of the methodologies presented herein. By way of example only, apparatus 1100 can be configured to implement one or more of the steps of methodology 400 of FIG. 4 for the dynamic placement of applications in a cellular network mobile cloud, methodology 700 of FIG. 7 for making an edge-based request service decision, and/or methodology 1000 of FIG. 10 for making a core-based request service decision.

Apparatus 1100 comprises a computer system 1110 and removable media 1150. Computer system 1110 comprises a processor device 1120, a network interface 1125, a memory 1130, a media interface 1135 and an optional display 1140. Network interface 1125 allows computer system 1110 to connect to a network, while media interface 1135 allows computer system 1110 to interact with media, such as a hard drive or removable media 1150.

Processor device 1120 can be configured to implement the methods, steps, and functions disclosed herein. The memory 1130 could be distributed or local and the processor device 1120 could be distributed or singular. The memory 1130 could be implemented as an electrical, magnetic or optical memory, or any combination of these or other types of storage devices. Moreover, the term "memory" should be construed broadly enough to encompass any information able to be read from, or written to, an address in the addressable space accessed by processor device 1120. With this definition, information on a network, accessible through network interface 1125, is still within memory 1130 because the processor device 1120 can retrieve the information from the network. It should be noted that each distributed processor that makes up processor device 1120 generally contains its own addressable memory space. It should also be noted that some or all of computer system 1110 can be incorporated into an application-specific or general-use integrated circuit.

Optional display 1140 is any type of display suitable for interacting with a human user of apparatus 1100. Generally, display 1140 is a computer monitor or other similar display.

Although illustrative embodiments of the present invention have been described herein, it is to be understood that the invention is not limited to those precise embodiments, and that various other changes and modifications may be made by one skilled in the art without departing from the scope of the invention.

What is claimed is:

1. A method for dynamic placement of applications in a cellular network mobile cloud, the method comprising the steps of:
    (a) obtaining: (i) a model of the cellular network, (ii) a model of user mobility patterns in the cellular network, and (iii) a model of a profile of the applications;
    (b) upon receipt of requests from users for the applications, obtaining runtime states at edge servers in the mobile cloud;
    (c) upon obtaining the runtime states at the edge servers, placing the requests among the edge servers and a core server in the mobile cloud based on the models obtained in step (a) and the runtime states obtained in step (b), wherein the placement of the requests among the edge servers and the core server is optimized using a cost function to compare, for a given one of the requests, a cost of serving the given request at the edge servers and a cost of serving the given request at the core server, the method further comprising the steps of:
    determining a cost of serving a given one of the requests for an application A at a given one of the edge servers and a cost of serving the given request at the core;
    determining a remaining connection time for a user of the given request with the given edge server;
    predicting a response time for the given edge server to service the given request; and
    entering the given request to a queue at the given edge server if the cost of serving the given request at the given edge server is less than the cost of serving the given request at the core server, and the remaining connection time is greater than the response time predicted, otherwise forwarding the request to another server.

2. The method of claim 1, wherein the model of the cellular network is obtained from a network administrator.

3. The method of claim 1, wherein one or more of the models are programmatically imported from third parties.

4. The method of claim 1, wherein one or more of the models are obtained using request history of the edge servers.

5. The method of claim 4, further comprising the step of:
    determining from the request history of the edge servers one or more of: which of the applications were requested by which of the users, to which of the edge servers the requests were submitted and when, and a resource consumption of serving the requests.

6. The method of claim 1, wherein the step of obtaining the runtime states at the edge servers comprises the step of:
    determining whether a requested application is active or inactive at the edge servers.

7. The method of claim 1, wherein the step of obtaining the runtime states at the edge servers comprises the step of:
    determining a state of a request queue for the edge servers, wherein the state of the request queue comprises how many, and for which of the applications the requests are being made.

8. The method of claim 1, wherein the step of obtaining the runtime states at the edge servers comprises the step of:
    determining a total resource consumption of the edge servers based on one or more of CPU resource consumption, memory resource consumption, and network bandwidth consumption.

9. The method of claim 1, wherein the applications comprise at least the application A and an application B, one of which is active at a given one of the edge devices and one of which is inactive, the method further comprising the steps of:
    determining a suitability of running the application A and the application B at the given edge server, wherein the suitability is based on (1) a comparison of costs of serving requests for the application A and the application B at the given edge server versus at the core server and (2) a volume of the requests that can be served by the given edge server;
    determining an overhead of replacing the application A or the application B at the given edge server which is active with the one that is inactive; and
    replacing the application A or the application B at the given edge server which is active with the one that is inactive only if doing so results in an increase in the suitability, and the increase in the suitability is greater than the overhead.

10. The method of claim 1, wherein by forwarding the request to another server, the request is forwarded to the core server.

11. The method of claim 1, wherein by forwarding the request to another server, the request is forwarded to another given one of the edge servers when a cost of serving the given request at the other given edge server is less than the cost of serving the given request at the core server.

12. An apparatus for dynamic placement of applications in a cellular network mobile cloud, the apparatus comprising:
    a memory; and
    at least one processor device, coupled to the memory, operative to:
    (a) obtain: (i) a model of the cellular network, (ii) a model of user mobility patterns in the cellular network, and (iii) a model of a profile of the applications;
    (b) upon receipt of requests from users for the applications, obtain runtime states at edge servers in the mobile cloud;
    (c) upon obtaining the runtime states at the edge servers, place the requests among the edge servers and a core server in the mobile cloud based on the models obtained in step (a) and the runtime states obtained in step (b), wherein the placement of the requests among the edge servers and the core server is optimized using a cost function to compare, for a given one of the requests, a cost of serving the given request at the edge servers and a cost of serving the given request at the core server, wherein the at least one processor device is further operative to:
    determine a cost of serving a given one of the requests for an application A at a given one of the edge servers and a cost of serving the given request at the core;
    determine a remaining connection time for a user of the given request with the given edge server;
    predict a response time for the given edge server to service the given request; and
    enter the given request to a queue at the given edge server if the cost of serving the given request at the given edge server is less than the cost of serving the given request at the core server, and the remaining connection time is greater than the response time predicted, otherwise forwarding the request to another server.

13. The apparatus of claim 12, wherein the applications comprise at least the application A and an application B, one of which is active at a given one of the edge devices and one of which is inactive, and wherein the at least one processor device is further operative to:
    determine a suitability of running the application A and the application B at the given edge server, wherein the suitability is based on (1) a comparison of costs of serving requests for the application A and the application B at the given edge server versus at the core server and (2) a volume of the requests that can be served by the given edge server;
    determine an overhead of replacing the application A or the application B at the given edge server which is active with the one that is inactive; and
    replace the application A or the application B at the given edge server which is active with the one that is inactive only if doing so results in an increase in the suitability, and the increase in the suitability is greater than the overhead.

14. The apparatus of claim 12, wherein by forwarding the request to another server, the request is forwarded to the core server.

15. The apparatus of claim 12, wherein by forwarding the request to another server, the request is forwarded to another given one of the edge servers when a cost of serving the given request at the other given edge server is less than the cost of serving the given request at the core server.

16. A computer program product for dynamic placement of applications in a cellular network mobile cloud, the computer program product comprising a non-transitory computer readable storage medium having program instructions embodied therewith, the program instructions executable by a computer to cause the computer to:
    (a) obtain: (i) a model of the cellular network, (ii) a model of user mobility patterns in the cellular network, and (iii) a model of a profile of the applications;
    (b) upon receipt of requests from users for the applications, obtain runtime states at edge servers in the mobile cloud;
    (c) upon obtaining the runtime states at the edge servers, place the requests among the edge servers and a core server in the mobile cloud based on the models obtained in step (a) and the runtime states obtained in step (b), wherein the placement of the requests among the edge servers and the core server is optimized using a cost function to compare, for a given one of the requests, a cost of serving the given request at the edge servers and a cost of serving the given request at the core server, wherein the program instructions further cause the computer to:
    determine a cost of serving a given one of the requests for an application A at a given one of the edge servers and a cost of serving the given request at the core;
    determine a remaining connection time for a user of the given request with the given edge server;

predict a response time for the given edge server to service the given request; and enter the given request to a queue at the given edge server if the cost of serving the given request at the given edge server is less than the cost of serving the given request at the core server, and the remaining connection time is greater than the response time predicted, otherwise forwarding the request to another server.

* * * * *